United States Patent
Sung et al.

(10) Patent No.: US 12,552,417 B2
(45) Date of Patent: Feb. 17, 2026

(54) VEHICLE DRIVING CONTROL APPARATUS AND VEHICLE DRIVING CONTROL METHOD

(71) Applicants: HYUNDAI MOTOR COMPANY, Seoul (KR); KIA CORPORATION, Seoul (KR)

(72) Inventors: Young Jin Sung, Seoul (KR); Ji Hwan Park, Seoul (KR); Su Hong Chae, Hwaseong-si (KR); Chan Hee Jung, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 301 days.

(21) Appl. No.: 17/950,904

(22) Filed: Sep. 22, 2022

(65) Prior Publication Data
US 2023/0382434 A1    Nov. 30, 2023

(30) Foreign Application Priority Data

May 25, 2022  (KR) .......................... 10-2022-0064202

(51) Int. Cl.
*B60W 60/00* (2020.01)
*B60W 50/10* (2012.01)
(52) U.S. Cl.
CPC ........ *B60W 60/0053* (2020.02); *B60W 50/10* (2013.01); *B60W 2540/10* (2013.01); *B60W 2540/12* (2013.01)

(58) Field of Classification Search
None
See application file for complete search history.

(56) References Cited

U.S. PATENT DOCUMENTS

| | | | |
|---|---|---|---|
| 10,513,273 B1 | 12/2019 | Stark et al. | |
| 2015/0120124 A1 | 4/2015 | Bartels et al. | |
| 2016/0103449 A1* | 4/2016 | Desnoyer | B60W 10/04 701/23 |
| 2017/0057520 A1 | 3/2017 | Letwin et al. | |
| 2017/0151950 A1 | 6/2017 | Lien | |
| 2017/0248954 A1* | 8/2017 | Tomatsu | B60W 50/082 |
| 2017/0261981 A1* | 9/2017 | Ichikawa | B60W 50/082 |
| 2017/0334458 A1* | 11/2017 | Sato | B60W 50/082 |
| 2018/0150074 A1* | 5/2018 | Hashimoto | B60W 60/0053 |

(Continued)

FOREIGN PATENT DOCUMENTS

| | | |
|---|---|---|
| JP | 2718033 B2 | 2/1998 |
| JP | 2019018852 A | 2/2019 |
| KR | 20190124131 A | 11/2019 |

*Primary Examiner* — Erin M Piateski
*Assistant Examiner* — Eisen Yim
(74) *Attorney, Agent, or Firm* — Lempia Summerfield Katz LLC

(57) ABSTRACT

A vehicle driving control apparatus includes an input device that receives an input by a driver and a controller that performs control to perform autonomous driving for a predetermined time when there is a second input by the driver to perform the autonomous driving after it is determined that an accelerator pedal or a brake pedal has been pressed based on a first input by the driver. The controller may determine whether to maintain the autonomous driving according to whether there is a third input by the driver within the predetermined time.

16 Claims, 3 Drawing Sheets

(56) References Cited

U.S. PATENT DOCUMENTS

2019/0155279 A1* 5/2019 Tayama ................ B60W 30/00
2019/0204827 A1* 7/2019 Bhalla .................. G05D 1/0061
2019/0317494 A1  10/2019 Lee et al.

* cited by examiner

VEHICLE DRIVING CONTROL APPARATUS AND VEHICLE DRIVING CONTROL METHOD

CROSS-REFERENCE TO RELATED APPLICATION

This application claims the benefit of priority to Korean Patent Application No. 10-2022-0064202, filed in the Korean Intellectual Property Office on May 25, 2022, the entire contents of which are incorporated herein by reference.

TECHNICAL FIELD

The present disclosure relates to a vehicle driving control apparatus and a vehicle driving control method.

BACKGROUND

The role of a driver in autonomous driving varies according to autonomous driving levels. Referring to Society of Automotive Engineers (SAE) J3016, the driver's intervention is emphasized up to level 3, and the driver's intervention is eliminated at level 4 and above. Therefore, for autonomous vehicles in SAE levels 2 and 3, driving control between the driver and the vehicle is required to be stably switched at any time while driving.

In general, since the autonomous driving function is activated while the driver does not press the brake pedal or accelerator pedal, driving control is automatically transferred to the driver or the autonomous driving function is deactivated although there is driver input to activate the autonomous driving function after the driver has pressed the brake pedal or accelerator pedal. Accordingly, when there is a driver input for activating the autonomous driving function after the driver has pressed the brake pedal or the accelerator pedal, there is a limit in that autonomous driving is difficult to be performed.

SUMMARY

The present disclosure has been made to solve the above-mentioned problems occurring in the prior art while advantages achieved by the prior art are maintained intact.

An aspect of the present disclosure provides a vehicle driving control apparatus and a method, which control a vehicle when there is a driver input for activating an autonomous driving function after the driver has pressed a brake pedal or accelerator pedal.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, a vehicle driving control apparatus includes an input device that receives an input by a driver, and a controller that performs control to perform autonomous driving for a predetermined time when there is a second input by the driver to perform the autonomous driving after it is determined that an accelerator pedal or a brake pedal has been pressed based on a first input by the driver. The controller may determine whether to maintain the autonomous driving according to whether there is a third input by the driver within the predetermined time.

The controller may determine whether the accelerator pedal or the brake pedal has been pressed within the predetermined time based on the third input by the driver. The controller may also determine whether to maintain the autonomous driving according to a determination result.

The controller may perform control to maintain the autonomous driving when it is determined that the accelerator pedal or the brake pedal has not been pressed within the predetermined time based on the third input by the driver.

The controller may determine whether there is a fourth input by the driver when it is determined that the accelerator pedal or the brake pedal has been pressed within the predetermined time based on the third input by the driver.

The controller may determine whether there is the fourth input by the driver when the predetermined time has elapsed.

The fourth input may include the driver's grip of a steering wheel and the driver's brake override input.

The controller may perform control to deactivate the autonomous driving when it is determined that there is the fourth input by the driver.

The controller may determine whether there is a fifth input by the driver when it is determined that there is the fourth input by the driver.

The fifth input may include pressing of the accelerator pedal or pressing of the brake pedal.

The controller may perform control to transfer driving control to the driver when it is determined that there is the fifth input by the driver.

According to an aspect of the present disclosure, a vehicle driving control method includes determining whether an accelerator pedal or a brake pedal has been pressed based on a first input by a driver. The vehicle driving control method also includes performing autonomous driving for a predetermined time when there is a second input by the driver to perform the autonomous driving after it is determined that an accelerator pedal or a brake pedal has been pressed based on the first input by the driver. The vehicle driving control method also includes determining whether to maintain the autonomous driving according to whether there is a third input by the driver within the predetermined time.

The vehicle driving control method may further include determining whether the accelerator pedal or the brake pedal has been pressed within the predetermined time based on a third input by the driver. The vehicle driving control method may further determining whether to maintain the autonomous driving according to a determination result.

The vehicle driving control method may further include performing control to maintain the autonomous driving when it is determined that the accelerator pedal or the brake pedal has not been pressed within the predetermined time based on the third input by the driver.

The vehicle driving control method may further include determining whether there is a fourth input by the driver when it is determined that the accelerator pedal or the brake pedal has been pressed within the predetermined time based on the third input by the driver.

The vehicle driving control method may further include determining whether there is the fourth input by the driver when the predetermined time has elapsed.

The fourth input may include the driver's grip of a steering wheel and the driver's brake override input.

The vehicle driving control method may further include performing control to deactivate the autonomous driving when it is determined that there is the fourth input by the driver.

The vehicle driving control method may further include determining whether there is a fifth input by the driver when it is determined that there is the fourth input by the driver.

The fifth input may include pressing of the accelerator pedal or pressing of the brake pedal.

The vehicle driving control method may further include performing control to transfer driving control to the driver when it is determined that there is the fifth input by the driver.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
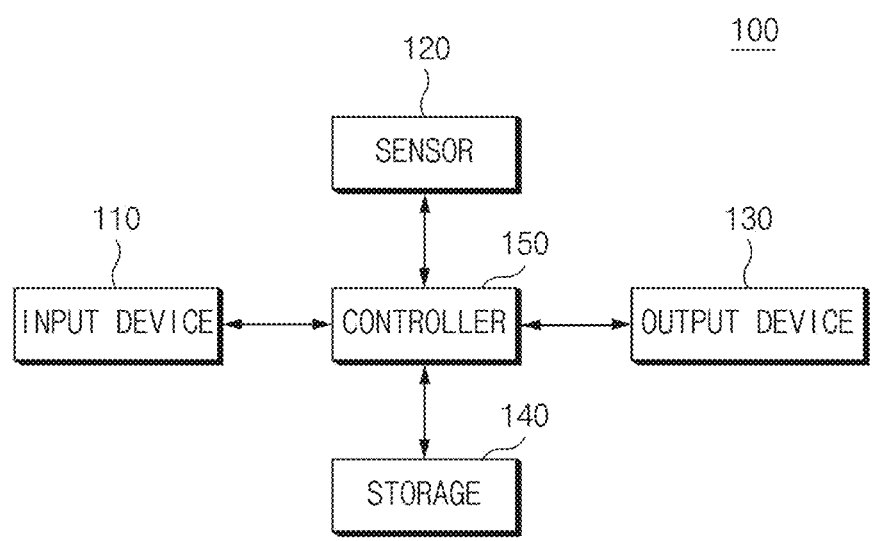
FIG. 1 is a diagram illustrating a configuration of a vehicle driving control apparatus according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence, or order of the constituent components. Unless otherwise defined, all terms used herein, including technical or scientific terms, have the same meanings as those generally understood by those having ordinary skill in the art to which the present disclosure pertains. Such terms as those defined in a generally used dictionary should be interpreted as having meanings equal to the contextual meanings in the relevant field of art and should not be interpreted as having ideal or excessively formal meanings unless clearly defined as having such in the present application. When a component, device, element, or the like of the present disclosure is described as having a purpose or performing an operation, function, or the like, the component, device, or element should be considered herein as being "configured to" meet that purpose or to perform that operation or function.

FIG. 1 is a diagram illustrating a configuration of a vehicle driving control apparatus according to an embodiment of the present disclosure.

Referring to FIG. 1, a vehicle driving control apparatus 100 according to an embodiment of the present disclosure may include an input device 110, a sensor 120, an output device 130, storage 140, and a controller 150.

The input device 110 may receive an input corresponding to an operation, motion, or voice of the driver and transmit the input to the controller 150, and the controller 150 may control operation of a vehicle according to input information.

According to an embodiment, the input device 110 may include a touch input means or a mechanical input means. For example, the input device 110 may be provided in one region of a steering wheel, and the driver may operate the input device 110 with a finger while holding the steering wheel. As another example, the input device 110 may be implemented as at least one of a motion sensor for detecting a driver's motion or a voice recognition sensor for detecting a driver's voice and or a combination thereof.

The sensor 120 may include various sensors, which detect a state of the vehicle and obtain driving information. According to an embodiment, the sensor 120 may include a speed sensor for detecting a vehicle speed, a steering sensor for detecting rotation of a steering wheel, an accelerator pedal sensor, a brake pedal sensor, and the like.

The output device 130 may provide a function provided to the input device 110 visually or aurally. Also, the output device 130 may output an image or sound under the control of the controller 150. To this end, the output device 130 may be implemented as a display device, a sound output device, or the like. Here, the display device may include a display of a navigation device, a head-up display (HUD), a cluster, and the like.

The storage 140 may store at least one or more algorithms for performing operations or execution of various commands for the operation of the vehicle driving control apparatus according to an embodiment of the present disclosure. The storage 140 may include at least one medium of a flash memory, a hard disk, a memory card, a Read-Only Memory (ROM), a Random Access Memory (RAM), an Electrically Erasable Programmable Read-Only Memory (EEPROM), a Programmable Read-Only Memory (PROM), a magnetic memory, a magnetic disk, or an optical disk.

The controller 150 may be implemented by various processing devices such as a microprocessor incorporating a semiconductor chip capable of operating or executing various instructions or the like and may control an operation of the vehicle driving control apparatus according to an embodiment of the present disclosure.

The controller 150 may determine whether autonomous driving is possible based on the state of the vehicle and the driving information. When it is determined that the autonomous driving is possible, the controller 150 may output a message or a speech guiding that the autonomous driving is possible through the output device 130.

The controller 150 may determine whether there is a first input by the driver in a state in which autonomous driving is possible. Here, the driver's first input may include pressing of the accelerator pedal or pressing of the brake pedal.

When it is determined that there is a driver's first input and there is a second input by the driver to perform autonomous driving, the controller 150 may perform control to perform autonomous driving for a predetermined time (e.g., 4 seconds). In this case, the controller 150 may output a guide message such that the driver is able to release the first input.

According to an embodiment, the controller 150 may output a guide message 'Please stop pressing the brake pedal' when the driver is pressing the brake pedal. The controller 150 may also output a guide message 'Please stop pressing the acceleration pedal' when the driver is pressing the accelerator pedal.

The controller 150 may determine whether a predetermined time during which autonomous driving is performed has elapsed. When it is determined that the predetermined time has not elapsed, the controller 150 may determine whether there is a third input by the driver. Here, the third input may include the driver's pressing of the accelerator pedal or the driver's pressing of the brake pedal within a predetermined time during which autonomous driving is performed.

The controller 150 may determine whether the accelerator pedal or the brake pedal is pressed based on the driver's third input within a predetermined time during which autonomous driving is performed. The controller 150 may also determine whether to maintain autonomous driving.

According to an embodiment, when it is determined that there is no third input within the predetermined time during which autonomous driving is performed, i.e., when it is determined that the accelerator pedal has not been pressed or the brake pedal has not been pressed, the controller 150 may determine to maintain performing of autonomous driving.

On the other hand, when it is determined that there is a third input within the predetermined time during which autonomous driving is performed, i.e., when it is determined that the accelerator pedal has been pressed or the brake pedal has been pressed, the controller 150 may determine whether there is a fourth input by the driver.

On the other hand, when it is determined that the predetermined time during which autonomous driving is performed has elapsed, the controller 150 may determine whether there is a fourth input by the driver.

On the other hand, the controller 150 may perform autonomous driving when it is determined that there is the driver's second input for performing autonomous driving after it has been determined that there is no driver's first input in a state in which autonomous driving is possible. In addition, the controller 150 may determine whether there is a fourth input by the driver after autonomous driving has been performed.

Here, the fourth input may include the driver's grip of the steering wheel and the driver's brake override input. Here, the brake override input may include an operation of pressing the brake with a braking amount greater than the braking amount calculated by the controller 150 during autonomous driving.

When it is determined that there is a fourth input by the driver, the controller 150 may perform control to deactivate autonomous driving.

Meanwhile, when it is determined that there is no fourth input by the driver, the controller 150 may determine whether there is a fifth input by the driver. Here, the fifth input may include pressing of the accelerator pedal or pressing of the brake pedal.

When it is determined that there is a fifth input by the driver, the controller 150 may perform control to transfer driving control to the driver. Meanwhile, when it is determined that there is no fifth input by the driver, the controller 150 may perform control to maintain autonomous driving.

Figure 2:
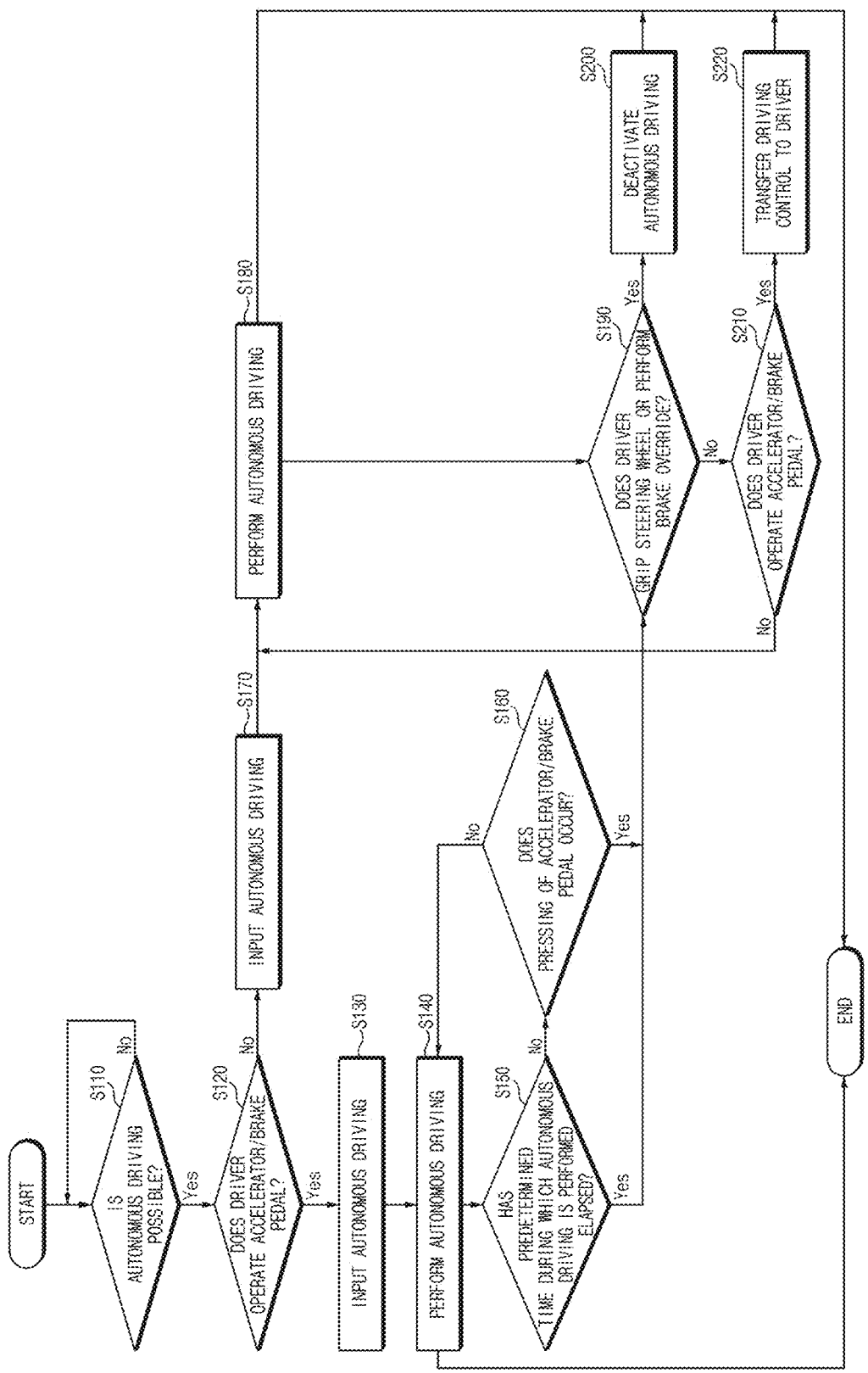
FIG. 2 is a diagram illustrating a vehicle driving control method according to an embodiment of the present disclosure.

FIG. 2 is a diagram illustrating a vehicle driving control method according to an embodiment of the present disclosure.

Referring to FIG. 2, the controller 150 may determine whether autonomous driving is possible based on the state of the vehicle and the driving information (S110).

When it is determined in S110 that the autonomous driving is possible (Yes in S110), the controller 150 may output a message or a speech guiding that the autonomous driving is possible through the output device 130 (No in S110). When it is not determined in S110 that the autonomous driving is possible, the controller 150 may re-determine whether the autonomous driving is possible.

The controller 150 may determine whether there is a first input by the driver when autonomous driving is possible (S120). In S120, the driver's first input may include pressing of the accelerator pedal or pressing of the brake pedal.

When it is determined in S120 that there is a driver's first input (Yes in S120) and there is a second input by the driver to perform autonomous driving (S130), the controller 150 may perform control to perform autonomous driving for a predetermined time (e.g., 4 seconds) (S140). In S140, the controller 150 may output a guide message so that the driver is able to release the first input.

According to an embodiment, the controller 150 may output a guide message 'Please stop pressing the brake pedal' when the driver is pressing the brake pedal. The controller 150 may also output a guide message 'Please stop pressing the acceleration pedal' when the driver is pressing the accelerator pedal.

The controller 150 may determine whether a predetermined time for which autonomous driving is performed has elapsed (S150). When it is determined in S150 that the predetermined time has not elapsed (No in S150), the controller 150 may determine whether there is a third input by the driver (S160). In S160, the third input may include the driver's pressing of the accelerator pedal or the driver's pressing of the brake pedal within a predetermined time during which autonomous driving is performed.

The controller 150 may determine whether the accelerator pedal or the brake pedal is pressed based on the driver's third input within a predetermined time during which autonomous driving is performed. The controller 150 may also determine whether to maintain autonomous driving.

According to an embodiment, when it is determined in S160 that there is no third input within the predetermined time during which autonomous driving is performed (No in S160), i.e., when it is determined that the accelerator pedal has not been pressed or the brake pedal has not been pressed, the controller 150 may determine to maintain performing of autonomous driving (S140).

On the other hand, when it is determined in S160 that there is a third input within the predetermined time during which autonomous driving is performed (Yes in S160), i.e., when it is determined that the accelerator pedal has been pressed or the brake pedal has been pressed, the controller 150 may determine whether there is a fourth input by the driver (S190).

On the other hand, when it is determined in S150 that the predetermined time during which autonomous driving is performed has elapsed (Yes in S150), the controller 150 may determine whether there is a fourth input by the driver (S190).

On the other hand, the controller 150 may perform autonomous driving when it is determined in S120 that there is no driver's first input in a state in which autonomous driving is possible (No in S120) and it is determined in S170 that there is the driver's second input for performing autonomous driving (S180).

The controller 150 may determine whether there is a fourth input by the driver after autonomous driving has been performed (S190).

In S190, the fourth input may include the driver's grip of the steering wheel and the driver's brake override input. Here, the brake override input may include an operation of pressing the brake with a braking amount greater than the braking amount calculated by the controller 150 during autonomous driving.

When it is determined in S190 that there is a fourth input by the driver (Yes in S190), the controller 150 may perform control to deactivate autonomous driving (S200).

Meanwhile, when it is determined in S190 that there is no fourth input by the driver (No in S190), the controller 150 may determine whether there is a fifth input by the driver (S210). In S210, the fifth input may include pressing of the accelerator pedal or pressing of the brake pedal.

When it is determined in S210 that there is a fifth input by the driver (Yes in S210), the controller 150 may perform control to transfer driving control to the driver (S220). Meanwhile, when it is determined in S210 that there is no fifth input by the driver, the controller 150 may perform control to maintain autonomous driving (S180).

Figure 3:
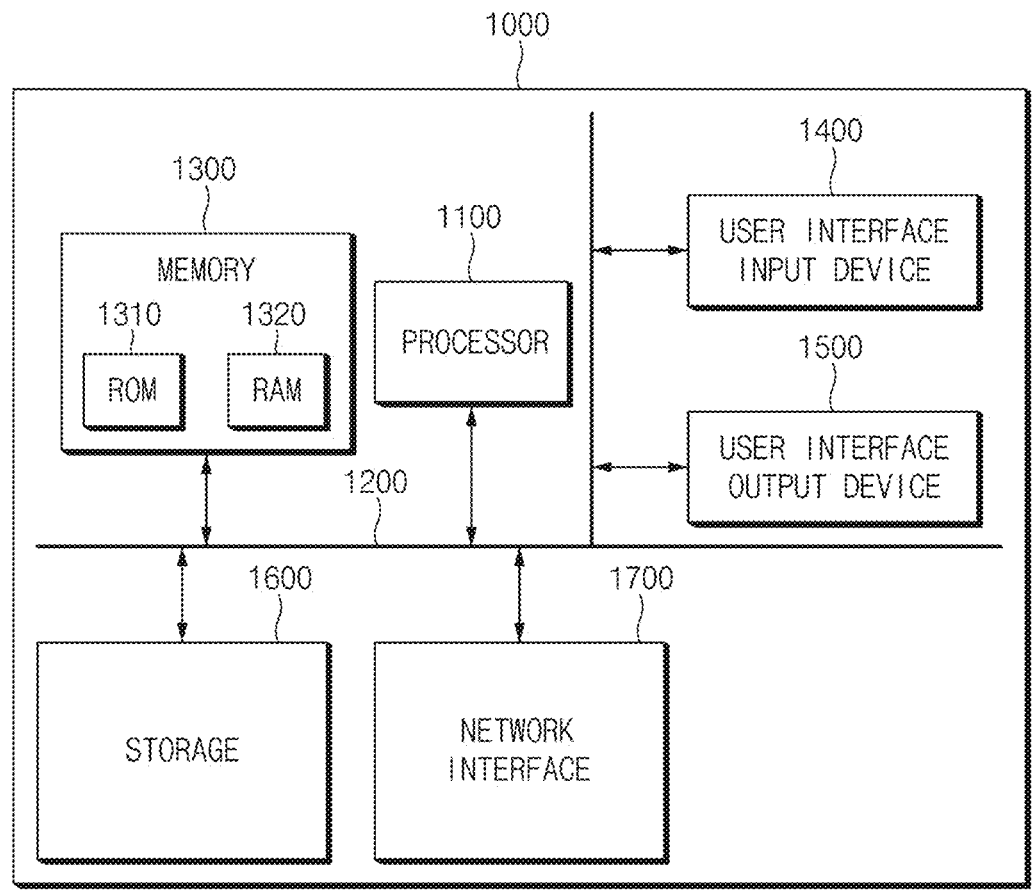
FIG. 3 a diagram showing a configuration of a computing system for executing a method according to an embodiment of the present disclosure.

FIG. 3 a diagram showing a configuration of a computing system for executing a method according to an embodiment of the present disclosure.

Referring to FIG. 3, a computing system 1000 may include at least one processor 1100, a memory 1300, a driver interface input device 1400, a driver interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (in other words, the memory 1300 and/or the storage 1600) such as a RAM, a flash memory, a ROM, an EPROM, an EEPROM, a register, a hard disk, a removable disk, and a CD-ROM. The storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a driver terminal. In another case, the processor and the storage medium may reside in the driver terminal as separate components.

The above description is merely illustrative of the technical idea of the present disclosure. Various modifications and variations may be made without departing from the essential characteristics of the present disclosure by those having ordinary skill in the art to which the present disclosure pertains.

Therefore, the embodiments of the present disclosure are provided to explain the spirit and scope of the present disclosure, but not to limit them, so that the spirit and scope of the present disclosure is not limited by the embodiments. The scope of protection of the present disclosure should be interpreted by the following claims, and all technical ideas within the scope equivalent thereto should be construed as being included in the scope of the present disclosure.

The vehicle driving control apparatus and method according to the embodiment of the present disclosure allow autonomous driving to be performed according to the driver's driving operation when there is a driver input for activating an autonomous driving function after the driver has pressed a brake pedal or accelerator pedal. Thus, the safety and convenience of autonomous driving may be improved.

Hereinabove, although the present disclosure has been described with reference to embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

What is claimed is:

1. A vehicle driving control apparatus comprising:
    a controller configured to:
    determine whether there is a first input by a driver corresponding to an operation of the driver in a state in which autonomous driving is possible, wherein the first input includes pressing of the accelerator pedal or pressing of the brake pedal;
    perform control to perform autonomous driving for a predetermined time when there is a second input by the driver corresponding to the operation of the driver to perform the autonomous driving after it is determined that the accelerator pedal or the brake pedal has been pressed based on the first input by the driver, wherein the controller determines whether to maintain the autonomous driving according to whether there is a third input by the driver corresponding to the operation of the driver within the predetermined time,
    wherein the controller is configured to determine whether there is a fourth input by the driver corresponding to the operation of the driver when it is determined that the accelerator pedal or the brake pedal has been pressed within the predetermined time based on the third input by the driver,
    wherein the fourth input includes the driver's grip of a steering wheel and the driver's brake override input,
    wherein the driver's brake override input includes an operation of pressing the brake pedal with a braking amount greater than the braking amount calculated by the controller during autonomous driving, and
    wherein the controller is configured to:
    output a guide message such that the driver is able to release the first input when the controller performs control to perform autonomous driving for a predetermined time.

2. The vehicle driving control apparatus of claim 1, wherein the controller is configured to determine whether the accelerator pedal or the brake pedal has been pressed within the predetermined time based on the third input by the driver, and is configured to determine whether to maintain the autonomous driving according to a determination result.

3. The vehicle driving control apparatus of claim 1, wherein the controller is configured to perform control to maintain the autonomous driving when it is determined that the accelerator pedal or the brake pedal has not been pressed within the predetermined time based on the third input by the driver.

4. The vehicle driving control apparatus of claim 1, wherein the controller is configured to determine whether there is the fourth input by the driver when the predetermined time has elapsed.

5. The vehicle driving control apparatus of claim 1, wherein the controller is configured to perform control to deactivate the autonomous driving when it is determined that there is the fourth input by the driver.

6. The vehicle driving control apparatus of claim 1, wherein the controller is configured to determine whether there is a fifth input by the driver when it is determined that there is the fourth input by the driver.

7. The vehicle driving control apparatus of claim 6, wherein the fifth input includes pressing of the accelerator pedal or pressing of the brake pedal.

8. The vehicle driving control apparatus of claim 6, wherein the controller is configured to perform control to transfer driving control to the driver when it is determined that there is the fifth input by the driver.

9. A vehicle driving control method comprising:
determining whether there is a first input by a driver in a state in which autonomous driving is possible, wherein the first input includes pressing of an accelerator pedal or pressing of a brake pedal;
performing autonomous driving for a predetermined time when there is a second input by the driver to perform the autonomous driving after it is determined that the accelerator pedal or the brake pedal has been pressed based on the first input by the driver; and
determining whether to maintain the autonomous driving according to whether there is a third input by the driver within the predetermined time,
wherein the method further comprises:
determining whether there is a fourth input by the driver when it is determined that the accelerator pedal or the brake pedal has been pressed within the predetermined time based on the third input by the driver,
wherein the fourth input includes the driver's grip of a steering wheel and the driver's brake override input, and
wherein the driver's brake override input includes an operation of pressing the brake pedal with a braking amount greater than the braking amount calculated during autonomous driving,
wherein the method further comprises outputting a guide message such that the driver is able to release the first input when the controller performs control to perform autonomous driving for a predetermined time.

10. The vehicle driving control method of claim 9, further comprising:
determining whether the accelerator pedal or the brake pedal has been pressed within the predetermined time based on a third input by the driver, and
determining whether to maintain the autonomous driving according to a determination result.

11. The vehicle driving control method of claim 9, further comprising:
performing control to maintain the autonomous driving when it is determined that the accelerator pedal or the brake pedal has not been pressed within the predetermined time based on the third input by the driver.

12. The vehicle driving control method of claim 9, further comprising:
determining whether there is the fourth input by the driver when the predetermined time has elapsed.

13. The vehicle driving control method of claim 9, further comprising:
performing control to deactivate the autonomous driving when it is determined that there is the fourth input by the driver.

14. The vehicle driving control method of claim 9, further comprising determining whether there is a fifth input by the driver when it is determined that there is the fourth input by the driver.

15. The vehicle driving control method of claim 14, wherein the fifth input includes pressing of the accelerator pedal or pressing of the brake pedal.

16. The vehicle driving control method of claim 14, further comprising:
performing control to transfer driving control to the driver when it is determined that there is the fifth input by the driver.

* * * * *